(12) United States Patent
Lee et al.

(10) Patent No.: US 11,264,618 B2
(45) Date of Patent: Mar. 1, 2022

(54) ELECTRODE INCLUDING CURRENT COLLECTOR WITH SURFACE IRREGULARITY, LITHIUM METAL LAYER, INSULATING PROTECTIVE LAYER, LITHIUM ION-ISOLATING LAYER, AND SECONDARY BATTERY HAVING THE SAME

(71) Applicant: LG Chem, Ltd., Seoul (KR)

(72) Inventors: Yong-Hee Lee, Daejeon (KR);
Dong-Hyeon Kang, Daejeon (KR);
In-Sung Uhm, Daejeon (KR);
Sung-Joong Kang, Daejeon (KR);
Min-Chul Jang, Daejeon (KR);
Byoung-Kuk Son, Daejeon (KR);
Dong-Chan Lee, Daejeon (KR)

(73) Assignee: LG Energy Solution, Ltd.

( * ) Notice: Subject to any disclaimer, the term of this patent is extended or adjusted under 35 U.S.C. 154(b) by 156 days.

(21) Appl. No.: 16/568,947

(22) Filed: Sep. 12, 2019

(65) Prior Publication Data

US 2020/0006779 A1   Jan. 2, 2020

Related U.S. Application Data

(63) Continuation of application No. PCT/KR2018/010521, filed on Sep. 7, 2018.

(30) Foreign Application Priority Data

Sep. 7, 2017 (KR) .................. 10-2017-0114598
Sep. 7, 2017 (KR) .................. 10-2017-0114599

(51) Int. Cl.
*H01M 4/74* (2006.01)
*H01M 4/75* (2006.01)
(Continued)

(52) U.S. Cl.
CPC ............... *H01M 4/74* (2013.01); *H01M 4/75* (2013.01); *H01M 4/78* (2013.01);
(Continued)

(58) Field of Classification Search
CPC ............ H01M 4/74; H01M 4/75; H01M 4/78; H01M 10/0431; H01M 10/0525; H01M 10/0587
(Continued)

(56) References Cited

U.S. PATENT DOCUMENTS

2006/0110661 A1   5/2006  Lee et al.
2011/0281167 A1   11/2011  Sabi et al.
(Continued)

FOREIGN PATENT DOCUMENTS

CN    103875115 A    6/2014
CN    104393232 A    3/2015
(Continued)

OTHER PUBLICATIONS

Extended European Search Report with Written Opinion for Application No. 18853062.0 dated Jul. 21, 2020, 16 pages.
(Continued)

*Primary Examiner* — Sean P Cullen
(74) *Attorney, Agent, or Firm* — Lerner, David, Littenberg, Krumholz & Mentlik, LLP (57) ABSTRACT

A lithium metal electrode includes a current collector having a surface irregularity structure, a lithium metal layer disposed outside of the surface irregularity structure except the uppermost surface of the surface irregularity structure in the current collector, an electron-insulating protective layer disposed outside of the lithium metal layer, and a lithium ion-isolating layer disposed (1) on the uppermost surface of the surface irregularity structure of the current collector, or (2) on the uppermost surface of the surface irregularity (Continued)

structure of the current collector, on the uppermost surface of the lithium metal layer, and on the uppermost surface of the electron-insulating protective layer, wherein the electron-insulating protective layer includes a non-porous layer transporting lithium ions and having no pores, and a polymer porous layer disposed outside thereof. A lithium secondary battery and flexible secondary battery including the lithium metal electrode are also provided.

15 Claims, 7 Drawing Sheets

(51) Int. Cl.
  *H01M 4/78* (2006.01)
  *H01M 10/04* (2006.01)
  *H01M 10/0525* (2010.01)
  *H01M 10/0587* (2010.01)
(52) U.S. Cl.
  CPC ... *H01M 10/0431* (2013.01); *H01M 10/0525* (2013.01); *H01M 10/0587* (2013.01)
(58) Field of Classification Search
  USPC .................................................. 429/216, 249
  See application file for complete search history.

(56) References Cited

U.S. PATENT DOCUMENTS

| | | | |
|---|---|---|---|
| 2012/0100409 A1 | 4/2012 | Kwon et al. | |
| 2012/0121983 A1 | 5/2012 | Yoon et al. | |
| 2012/0276459 A1 | 11/2012 | Im et al. | |
| 2013/0149605 A1 | 6/2013 | Kakehata et al. | |
| 2014/0170455 A1 | 6/2014 | Kwon et al. | |
| 2014/0212719 A1 | 7/2014 | Kwon et al. | |
| 2014/0272594 A1* | 9/2014 | Safont Sempere ... | H01M 4/134 429/231.95 |
| 2014/0377620 A1 | 12/2014 | Kwon et al. | |
| 2016/0020461 A1 | 1/2016 | Yang | |
| 2016/0020462 A1 | 1/2016 | Yang | |
| 2016/0126555 A1 | 5/2016 | Kwon et al. | |
| 2016/0133942 A1 | 5/2016 | Kwon et al. | |
| 2016/0204476 A1 | 7/2016 | Kobayashi | |
| 2016/0329597 A1 | 11/2016 | Park | |
| 2017/0117551 A1 | 4/2017 | Choi et al. | |
| 2017/0237109 A1 | 8/2017 | Kwon et al. | |
| 2018/0102523 A1* | 4/2018 | Yang ..................... | H01M 4/382 |

FOREIGN PATENT DOCUMENTS

| | | |
|---|---|---|
| CN | 105794018 A | 7/2016 |
| EP | 2973806 A1 | 1/2016 |
| JP | 2006156351 A | 6/2006 |
| JP | 2010182448 A | 8/2010 |
| JP | 2015518644 A | 7/2015 |
| JP | 2016029652 A | 3/2016 |
| KR | 20020059181 A | 7/2002 |
| KR | 20060087179 A | 8/2006 |
| KR | 20120041490 A | 5/2012 |
| KR | 20120053180 A | 5/2012 |
| KR | 20120122674 A | 11/2012 |
| KR | 20130040158 A | 4/2013 |
| KR | 20130136150 A | 12/2013 |
| KR | 20140076158 A | 6/2014 |
| KR | 20140132310 A | 11/2014 |
| KR | 20150061602 A | 6/2015 |
| KR | 20160009511 A | 1/2016 |
| KR | 20160051202 A | 5/2016 |
| KR | 20160052323 A | 5/2016 |
| KR | 20160131806 A | 11/2016 |
| KR | 20170036481 A | 4/2017 |
| KR | 20170094016 A | 8/2017 |
| WO | 2015030230 A1 | 3/2015 |
| WO | 2016160958 A1 | 10/2016 |

OTHER PUBLICATIONS

International Search Report including the Written Opinion for Application No. PCT/KR2018/010521 dated Dec. 31, 2018.
Partial Supplementary European Search Report including Written Opinion for Application No. EP18853062.0 dated Apr. 17, 2020, 15 pages.
Search Report for Chinese Application No. 201880006152.9 dated Dec. 14, 2021. 2 pgs.

* cited by examiner

ELECTRODE INCLUDING CURRENT COLLECTOR WITH SURFACE IRREGULARITY, LITHIUM METAL LAYER, INSULATING PROTECTIVE LAYER, LITHIUM ION-ISOLATING LAYER, AND SECONDARY BATTERY HAVING THE SAME

CROSS-REFERENCE TO RELATED APPLICATIONS

The present application is a continuation of International Application No. PCT/KR2018/010521, filed Sep. 7, 2018, published in Korean, which claims priority to Korean Patent Application No. 10-2017-0114598 filed on Sep. 7, 2017 and Korean Patent Application No. 10-2017-0114599 filed Sep. 7, 2017 in the Republic of Korea, the disclosures of which are incorporated herein by reference.

TECHNICAL FIELD

The present disclosure relates to a lithium electrode, more particularly a three-dimensional lithium electrode having improved safety and excellent life characteristics and rate characteristics, and a lithium secondary battery and flexible secondary battery including the same.

BACKGROUND ART

As technological development and a need for mobile instruments have increased, researchable secondary batteries which can be downsized and provided with high capacity have been increasingly in demand. In addition, among such secondary batteries, lithium secondary batteries having high energy density and voltage have been commercialized and used widely.

A lithium secondary battery has a structure in which an electrode assembly including a cathode, an anode and a separator interposed between the cathode and the anode is stacked or wound, and is formed by introducing the electrode assembly into a battery casing and injecting a non-aqueous electrolyte thereto. The lithium secondary battery generates electric energy by oxidation/reduction upon the intercalation/deintercalation of lithium ions into/from the cathode and the anode.

In general, when using lithium metal as an active material for an electrode, it is advantageous in that high capacity can be realized. However, while a battery repeats charge/discharge cycles, lithium metal is dissolved or deposited by its ionization and is grown in the form of dendritic lithium. This results in a short-circuit in the battery and dead lithium. Thus, there are problems in that the battery has poor stability and short life.

Therefore, various attempts have been made in order to inhibit growth of dendritic lithium. However, the above-mentioned problems are not solved completely to date.

DISCLOSURE

Technical Problem

The present disclosure is designed to solve the problems of the related art, and therefore the present disclosure is directed to providing a three-dimensional lithium electrode which inhibits non-uniform growth of dendritic lithium to improve the safety of a battery and to provide a battery with excellent life characteristics and rate characteristics.

The present disclosure is also designed to provide a lithium secondary battery and flexible battery including the lithium electrode.

Technical Solution

In one aspect of the present disclosure, there is provided a lithium metal electrode according to any one of the following embodiments.

According to the first embodiment, there is provided a lithium metal electrode including:
a current collector having a surface irregularity structure;
a lithium metal layer disposed outside of the surface irregularity structure except the uppermost surface of the surface irregularity structure in the current collector;
an electron-insulating protective layer disposed outside of the lithium metal layer; and
a lithium ion-isolating layer disposed (1) on the uppermost surface of the surface irregularity structure of the current collector, or (2) on the uppermost surface of the surface irregularity structure of the current collector, on the uppermost surface of the lithium metal layer, and on the uppermost surface of the electron-insulating protective layer,
wherein the electron-insulating protective layer includes a non-porous layer transporting lithium ions and having no pores, and a polymer porous layer disposed outside thereof.

According to the second embodiment, there is provided the lithium metal electrode as defined in the first embodiment, wherein the surface irregularity structure is provided with protrusions formed upwardly, and grooves formed between adjacent protrusions.

According to the third embodiment, there is provided the lithium metal electrode as defined in the second embodiment, wherein vertical sections of the protrusions have at least one shape selected from tetragonal, trapezoidal and cross shapes, and vertical shapes of the grooves have at least one shape selected from semi-circular, sector, triangular, tetragonal and dumbbell shapes.

According to the fourth embodiment, there is provided the lithium metal electrode as defined in any one of the first to the third embodiments, wherein the non-porous layer includes an inorganic solid electrolyte and an electrolyte-swelling polymer.

According to the fifth embodiment, there is provided the lithium metal electrode as defined in the fourth embodiment, wherein the inorganic solid electrolyte and the electrolyte-swelling polymer are used at a weight ratio of 70:30 to 98:2.

According to the sixth embodiment, there is provided the lithium metal electrode as defined in the fourth or the fifth embodiment, wherein the inorganic solid electrolyte includes an oxide-based, phosphate-based, nitride-based or a sulfide-based electrolyte, or a combination of two or more thereof.

According to the seventh embodiment, there is provided the lithium metal electrode as defined in any one of the fourth to the sixth embodiments, wherein the electrolyte-swelling polymer includes a polyolefin-based, polyester-based, polyacryl-based, polyamide-based, polyurethane-based, cellulose-based, hydrocarbon-based or a polyol-based polymer, or a combination of two or more thereof.

According to the eighth embodiment, there is provided the lithium metal electrode as defined in any one of the fourth to the seventh embodiments, wherein the non-porous layer further includes a non-dielectric inorganic material including $Al_2O_3$, $SnO_2$, $Cu_3N_2$, $CeO_2$, MgO, NiO, CaO, ZnO, $ZrO_2$, $Y_2O_3$, $TiO_2$, SiC or $Li_3N$, or a combination of two or more thereof.

According to the ninth embodiment, there is provided the lithium metal electrode as defined in any one of the first to the eighth embodiments, wherein the polymer porous layer includes a polymer film having a porous structure capable of being swelled with an electrolyte.

According to the tenth embodiment, there is provided the lithium metal electrode as defined in the ninth embodiment, wherein the polymer film having a porous structure capable of being swelled with an electrolyte includes sponge polyurethane.

According to the eleventh embodiment, there is provided the lithium metal electrode as defined in any one of the first to the tenth embodiments, wherein the electron-insulating protective layer has a thickness of 1-1,000 μm.

According to the twelfth embodiment, there is provided the lithium metal electrode as defined in any one of the first to the eleventh embodiments, wherein the non-porous layer in the electron-insulating protective layer has a thickness of 1-500 nm.

According to the thirteenth embodiment, there is provided the lithium metal electrode as defined in any one of the first to the twelfth embodiments, wherein the lithium ion-isolating layer includes a polyolefin-based, polyester-based, polyamide-based or a polyurethane-based polymer, or a combination of two or more thereof.

In another aspect of the present disclosure, there is also provided a lithium secondary battery according to any one of the following embodiments.

According to the fourteenth embodiment, there is provided a lithium secondary battery including a cathode, an anode, a separator interposed between the cathode and the anode, and an electrolyte, wherein the anode is the lithium metal electrode as defined in any one of the first to the thirteenth embodiments.

According to the fifteenth embodiment, there is provided the lithium secondary battery as defined in the fourteenth embodiment, which is a cylindrical, prismatic, pouch, flexible or a coin lithium secondary battery.

In still another aspect of the present disclosure, there is provided a flexible secondary battery according to any one of the following embodiments.

According to the sixteenth embodiment, there is provided a flexible secondary battery including:

an internal electrode provided with an internal current collector and a lithium-containing internal electrode layer surrounding an outside of the internal current collector;

an electron-insulating protective layer surrounding an outside of the internal electrode, provided with a non-porous layer including an inorganic solid electrolyte and an electrolyte-swelling polymer, and further provided with a polymer porous layer surrounding an external surface of the non-porous layer;

an electron-insulating support surrounding an outside of the electron-insulating protective layer;

a separator layer surrounding an outside of the electron-insulating support; and an external electrode provided with an external electrode layer surrounding an outside of the separator layer and an external current collector surrounding an outside of the external electrode layer.

According to the seventeenth embodiment, there is provided the flexible secondary battery as defined in the sixteenth embodiment, wherein the inorganic solid electrolyte includes an oxide-based, phosphate-based, nitride-based or a sulfide-based electrolyte, or a combination of two or more thereof.

According to the eighteenth embodiment, there is provided the flexible secondary battery as defined in the sixteenth or the seventeenth embodiments, wherein the electrolyte-swelling polymer includes a polyolefin-based, polyester-based, polyacryl-based, polyamide-based, polyurethane-based, cellulose-based, hydrocarbon-based or a polyol-based polymer, or a combination of two or more thereof.

According to the nineteenth embodiment, there is provided the flexible secondary battery as defined in any one of the sixteenth to the eighteenth embodiments, wherein the electron-insulating support is a wound wire support surrounding the outside of the electron-insulating protective layer, the wound wire support has a thickness of 100 μm-3 mm, and the wound wire support has a pitch of 1 μm-1 cm.

In yet another aspect of the present disclosure, there is provided a flexible secondary battery according to the following embodiment.

According to the twentieth embodiment, there is provided a flexible secondary battery including:

two or more internal electrodes each provided with an internal current collector and a lithium-containing internal electrode layer surrounding the outside of the internal current collector;

an electron-insulating protective layer provided with a non-porous layer surrounding the outside of each of the two or more internal electrodes and a polymer porous layer surrounding the external surface of the non-porous layer;

an electron-insulating support surrounding the outside of the electron-insulating protective layer;

a separator layer surrounding the outside of the electron-insulating support; and an external electrode provided with an external electrode layer surrounding the outside of the separator layer and an external current collector surrounding the outside of the external electrode layer.

Advantageous Effects

The lithium electrode according to the present disclosure is provided with a current collector patterned with a surface irregularity structure, and thus shows flexibility and prevents a collapse of the electrode structure caused by volumetric swelling of lithium metal. In addition, the lithium electrode is provided with an electron-insulating protective layer including a non-porous layer and a polymer porous layer, and thus inhibits non-uniform growth of dendritic lithium, improves safety and provides excellent life characteristics and rate characteristics.

BEST MODE

Hereinafter, preferred embodiments of the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In addition, the description proposed herein is just a preferable example for the purpose of illustrations only, not intended to limit the scope of the disclosure, so it should be understood that other equivalents and modifications could be made thereto without departing from the scope of the disclosure.

FIGS. 1-5 are schematic views illustrating various embodiments of the lithium electrode according to the present disclosure.

Figure 1:
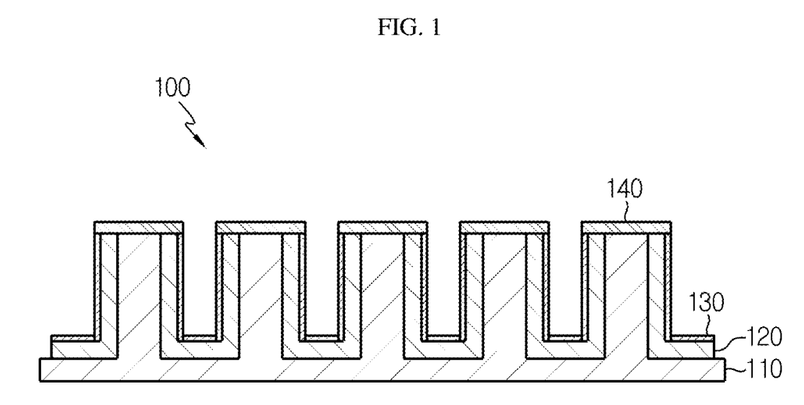
FIGS. 1-5 are schematic views illustrating various embodiments of the lithium electrode according to the present disclosure.
Figure 2:
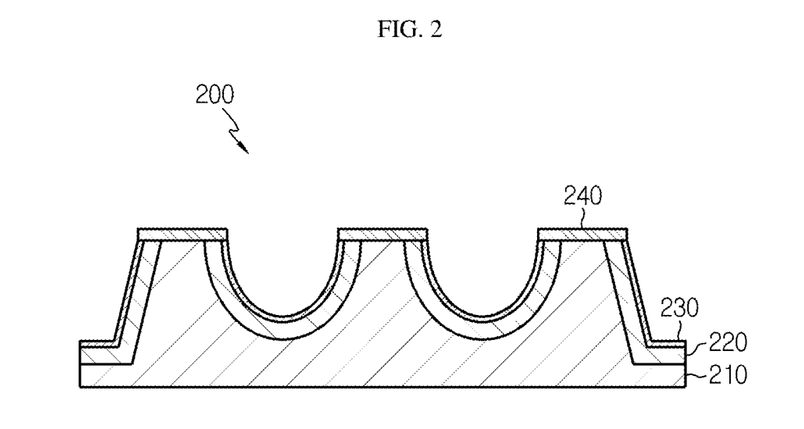
Figure 3:
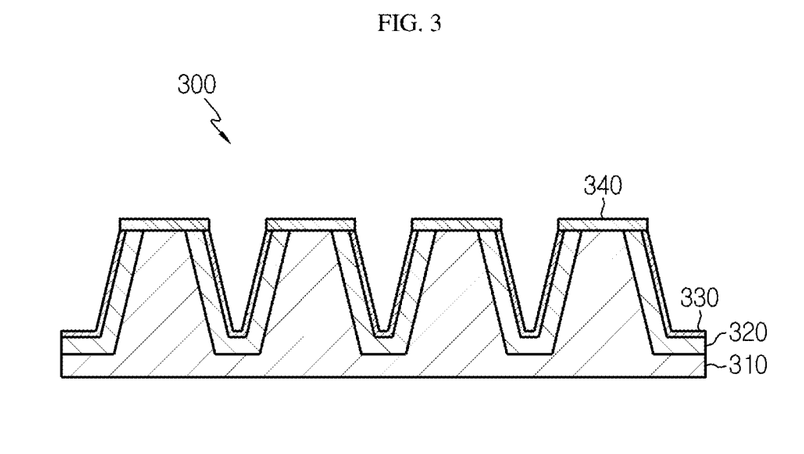
Figure 4:
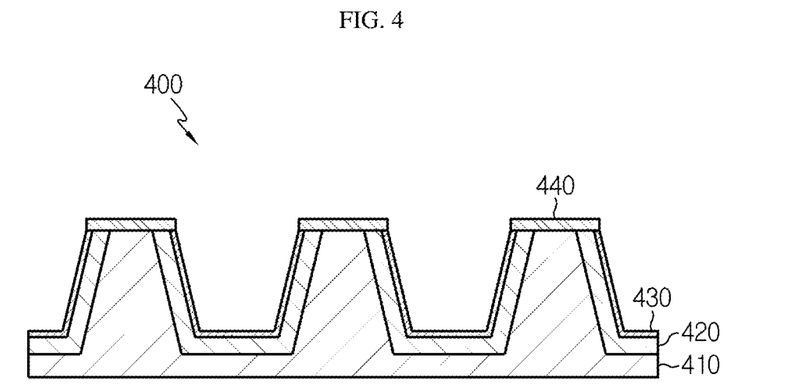
Figure 5:
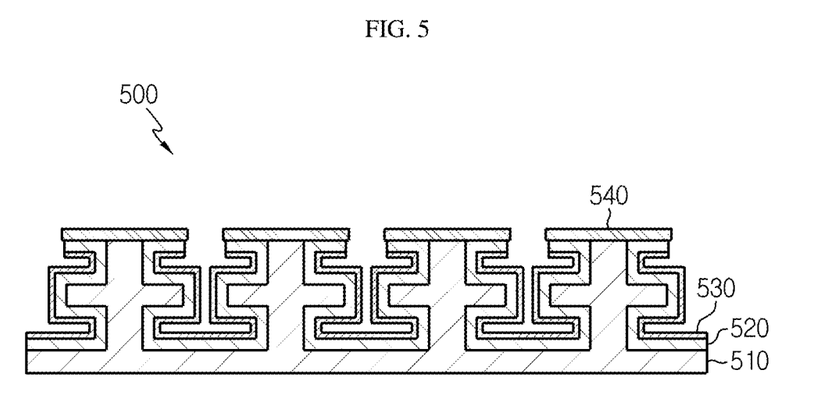
Figure 6:
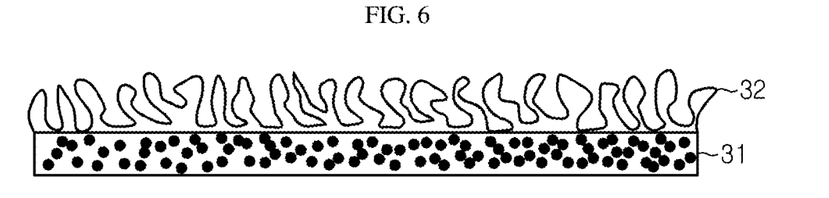
FIG. 6 is a schematic view illustrating the structure of the electron-insulating protective layer used in the lithium electrode according to an embodiment of the present disclosure.

Referring to FIGS. 1-5, the lithium electrode 100, 200, 300, 400, 500 according to an embodiment of the present disclosure includes: a current collector 110, 210, 310, 410, 510 having a surface irregularity structure; a lithium metal layer 120, 220, 320, 420, 520 disposed outside of the surface irregularity structure except the uppermost surface of the surface irregularity structure in the current collector; an electron-insulating protective layer 130, 230, 330, 430, 530 disposed outside of the lithium metal layer; and a lithium ion-isolating layer 140, 240, 340, 440, 540 disposed on the uppermost surface of the surface irregularity structure of the current collector, on the uppermost surface of the lithium metal layer, and on the uppermost surface of the electron-insulating protective layer. The lithium ion-isolating layer may be formed merely on the uppermost surface of the surface irregularity structure of the current collector. In addition, as shown in FIG. 6, the electron-insulating protective layer includes a non-porous layer 31 capable of transporting lithium ions but inhibiting growth of dendritic lithium by virtue of the absence of pores, and a polymer porous layer 32 capable of adjusting the direction of dendritic lithium growth toward the inside even if dendritic lithium is grown.

As used herein, the term 'outside' refers to the external region of the corresponding component and covers the portion of an element that is in contact with the surface of the corresponding component and the portion of the element spaced apart from the surface of the corresponding component. In the latter case, another layer may be interposed between the portion of the element that is in contact with the surface and the portion of the element that is spaced apart therefrom.

As used herein, the term 'upper side' means the portion of the element disposed at the uppermost position in the height direction of the corresponding component.

As used herein, the term 'non-porous layer' means a layer free from pores, and will be further defined by the method described hereinafter.

According to the present disclosure, the current collector used for the lithium electrode has a surface irregularity structure. The surface irregularity structure is provided with protrusions formed upwardly, and grooves formed between adjacent protrusions. In addition, vertical sections of the protrusions have at least one shape selected from tetragonal, trapezoidal, cross and polygonal shapes, and vertical shapes of the grooves have at least one shape selected from semi-circular, sector, triangular, tetragonal, dumbbell and polygonal shapes.

Thus, the current collector patterned with various shapes of surface irregularity structures may provide three-dimensional electrodes by forming an electrode layer and the other functional layers thereon in the directions toward the outside and upper side. It is possible to control the direction of dendritic lithium growth through the patterns. Since a space is formed in the gap among the surface irregularity structures forming the patterns, it is possible to alleviate volumetric swelling of the electrode layer occurring in charge/discharge processes, and thus to prevent the structural collapse of the electrode. It is also possible to impart flexibility during the manufacture of a battery by virtue of the use of the patterned current collector.

The surface irregularity structure may be formed by the conventional known patterning processes. For example, the current collector is coated with a patterned film, the coated current collector is dipped in an etching solution suitable for the material forming the current collector to carry out etching, and then the patterned film is removed to form a pattern on the current collector. In addition to this, various patterning methods may be used.

The surface irregularity structure has an average width of about 5-5,000 μm and an average height of about 1-5,000 μm to form a micropattern, but is not limited thereto.

The current collector may be made of from stainless steel, aluminum, nickel, titanium, baked carbon, copper; stainless steel surface-treated with carbon, nickel, titanium, silver, gold or platinum; aluminum-cadmium alloy; a non-conductive polymer surface-treated with a conductive material; a non-conductive polymer surface-treated with a metal; or a conductive polymer. When lithium metal is used as a negative electrode, it is preferred to use a current collector made of copper.

According to the present disclosure, the lithium metal layer 120, 220, 320, 420, 520 is formed on the current collector. Herein, the lithium metal layer may be formed through vapor deposition, electroplating or lamination of a lithium-based active material capable of realizing high capacity in the portion except the top surface of the surface irregularity structure. The vapor deposition, electroplating and lamination may be formed by various methods known to those skilled in the art.

The lithium metal layer may have a thickness of 1-2,000 μm. As the thickness is increased, the reversible capacity of a negative electrode is increased.

The lithium-based active material that may be used herein includes lithium, lithium oxide, lithium alloy and lithium alloy oxide, particularly lithium.

According to the present disclosure, the electron-insulating protective layer is formed on the surface of the lithium metal layer. Referring to FIG. 6, the electron-insulating protective layer has a dual layer structure including a non-porous layer 31 transporting lithium ions and having no pores, and a polymer porous layer 32.

Both the non-porous layer 31 and the polymer porous layer 32 include a material which cannot conduct electrons, and thus have electron insulating property.

According to the present disclosure, the non-porous layer 31 and the polymer porous layer 32 having electron insulating property can prevent reaction of Li ions intercalated/deintercalated into/from the lithium metal layer with electrons and deposition of Li, i.e., growth of dendritic lithium.

According to the present disclosure, the non-porous layer 31 is a layer capable of transporting lithium ions while not conducting electrons.

As used herein, the term 'non-porous layer' means a layer having a true density value of 1.8-2.1 g/cm³ when the true density is determined by the method as described hereinafter.

The true density can be determined as follows.

Based on the method as defined in JIS R7212, the true density is determined by using butanol. The method will be described hereinafter in brief.

The mass (m1) of a side tube-attached specific gravity bottle having an inner volume of about 40 mL is measured precisely. Next, a sample is introduced to the bottom of the specific gravity bottle evenly to a thickness of about 10 mm, and then the mass (m2) is measured precisely. Then, 1-butanol is added mildly thereto to a depth of about 20 mm from the bottom. After that, light vibration is applied to the specific gravity bottle and disappearance of large air bubbling is checked. Then, the specific gravity bottle is introduced to a desiccator and evacuated gradually to 2.0-2.7 kPa. The specific gravity bottle is maintained at the same pressure for 20 minutes and removed from the desiccator after generation of air bubbles is stopped, and then 1-butanol is added thereto again. After that, the specific gravity bottle is closed with a stopper and immersed in a thermostat water tank (controlled to a temperature of 30±0.03° C.) for 15 minutes or more, and then the liquid surface of 1-butanol is adjusted to the tag line. Then, the specific gravity bottle is removed and the external part thereof is wiped well. After that, the specific gravity bottle is cooled to room temperature and the weight (m4) is measured precisely. Then, the same specific gravity bottle is filled with 1-butanol alone and immersed in a thermostat water tank in the same manner as described above. After adjusting to the tag line, the weight (m3) of the specific gravity bottle is measured. In addition, distilled water, from which dissolved gases are removed by boiling right before its use, is received in a specific gravity bottle, and the specific gravity bottle is immersed in a thermostat water tank in the same manner as described above. After adjusting to the tag line, the weight (m5) of the specific gravity bottle is measured in the same manner as described above. The true density (ρBt) is calculated by the following Mathematical Formula 1:

$$\rho_{Bt} = \frac{m_2 - m_1}{m_2 - m_1 - (m_4 - m_3)} \times \frac{m_3 - m_1}{m_5 - m_1} d \quad \text{[Mathematical Formula 1]}$$

wherein d is the specific gravity (0.9946) of water at 30° C.

Particularly, the non-porous layer may include an inorganic solid electrolyte and an electrolyte-swelling polymer.

According to the present disclosure, the non-porous layer 31 may be formed on the outside of the lithium metal layer through thin film coating processes, such as vapor deposition, coating, lamination, or the like.

According to the present disclosure, the non-porous layer is free from pores. More particularly, the non-porous layer has a true density value of 1.8-2.1 g/cm³ and may be formed by the CIP process as described hereinafter.

The non-porous layer may have a thickness of 1-500 nm. Thus, since the non-porous layer is a thin film coating layer having a small thickness, it is possible to transport lithium ions even in the absence of pores.

In addition, the non-porous layer may have a modulus of 0.1-1 GPa, preferably 0.8-1 GPa. In this case, the non-porous layer ensures a predetermined strength, and thus can inhibit growth of dendritic lithium physically.

Moreover, since the non-porous layer has electron insulating property, it does not conduct electrons ($e^-$). Thus, it is possible to inhibit growth of dendritic lithium more efficiently on the surface of the corresponding layer. When the organic/inorganic composite non-porous layer has electroconductivity, $Li^+$ is reduced when it meets an electron ($e^-$). In this case, a large amount of $Li^+$ participates in the irreversible reaction in order to stabilize the reduced interface. When dendritic lithium is grown, non-uniform dendrite formation occurs due to the localization of electrons ($e^-$) to cause generation of a large amount of dead Li. Such a phenomenon causes degradation of the life characteristics of a battery.

In the non-porous layer, the inorganic solid electrolyte and the electrolyte-swelling polymer may be used at a ratio of 70:30 to 98:2, 75:25 to 95:5, or 80:20 to 90:10. Within the above-defined range, the non-porous layer shows an excellent effect of transporting lithium ions while not conducting electrons.

The inorganic solid electrolyte functions as a medium through which lithium ions are transported, and may include an oxide-based, phosphate-based, nitride-based or a sulfide-based electrolyte, or a combination of two or more thereof. For example, the oxide-based inorganic solid electrolyte may be any one selected from the group consisting of lithium lanthanum titanates (LLTO), lithium lanthanum zirconium oxides (LLZO), lithium super ionic conductors (LISICON) and a combination thereof. The phosphate-based inorganic solid electrolyte may be any one selected from the group consisting of lithium-aluminum-titanium-phosphates (LATP), lithium-aluminum-germanium-phosphates (LAGP) and a combination thereof. The nitride-based inorganic solid electrolyte may be lithium phosphorus oxynitride (LiPON), and the sulfide-based inorganic solid electrolyte may include any one selected from the group consisting of $Li_{10}GeP_2S_{12}$, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—ZmSn (wherein each of m and n is a positive number, and Z is any one of Ge, Zn and Ga), $Li_2S$—$GeS_2$, $Li_2S$—$SiS_2$—$Li_3PO_4$, Li$_2$S—SiS$_2$—LixMOy (wherein each of x and y is a positive number, and M is any one of P, Si, Ge, B, Al, Ga and In) and a combination thereof.

The electrolyte-swelling polymer undergoes a swelling phenomenon by which its volume is increased after it absorbs an electrolyte. Thus, it is possible to transport lithium ions, to inhibit formation of dendritic lithium generated at the interface with the lithium metal layer efficiently, and thus to minimize side reactions on the lithium metal surface.

Such an electrolyte-swelling polymer may include a polymer capable of transporting lithium ions after being swelled with an electrolyte while not conducting electrons, and particular examples of the polymer include a polyolefin-based, polyester-based, polyacryl-based, polyamide-based, polyurethane-based, cellulose-based, hydrocarbon-based or a polyol-based polymer, or a combination of two or more thereof. Particularly, examples of the polymer swelled with an electrolyte include, but are not limited to: polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, or the like.

In addition, the non-porous layer may further include a non-dielectric inorganic material in order to ensure the mechanical rigidity and ion conductivity of the protective layer.

The non-dielectric inorganic material may include Al$_2$O$_3$, SnO$_2$, Cu$_3$N$_2$, CeO$_2$, MgO, NiO, CaO, ZnO, ZrO$_2$, Y$_2$O$_3$, TiO$_2$, SiC, Li$_3$N or a combination of two or more thereof.

Meanwhile, the polymer porous layer serves as an electrolyte carrier in order to supply a sufficient amount of electrolyte to the electrode surface. The polymer porous layer may be formed by stacking a polymer film capable of being swelled with an electrolyte and having a porous structure on the outside of the non-porous layer, simultaneously with the non-porous layer or sequentially.

The polymer porous layer may have a thickness of 1-1,000 μm. In other words, the polymer porous layer may be formed to a larger thickness as compared to the non-porous layer and has flexibility. Thus, even when shrinking occurs in the height direction under the application of pressure within the above-defined range of thickness, it is possible to minimize the effect of shrinking.

The polymer contained in the polymer porous layer is not particularly limited, as long as it can be swelled with an electrolyte and can provide a porous structure through polymer phase separation. Typical examples of the polymer include polyurethane having a sponge structure.

Since the polymer porous layer includes a polymer which can be swelled with an electrolyte and has a porous structure, it is possible to inhibit non-uniform supply of lithium ions while providing a sufficient amount of electrolyte to the surface of the lithium metal layer by virtue of its swelling phenomenon. In addition, when no internal cracks are generated in the non-porous layer, or dendritic lithium passing through the non-porous layer is grown due to insufficient modulus and stress concentration, the polymer porous layer can induce the direction of dendritic lithium growth through the porous structure toward the inner part of the surface of the polymer porous layer, not the counter electrode.

Figure 7:
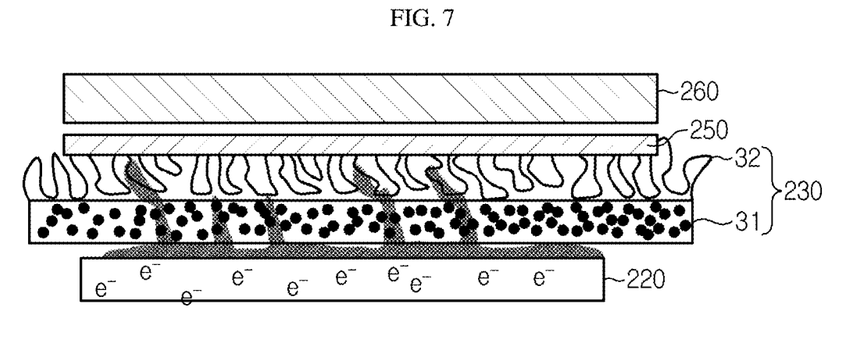
FIG. 7 illustrates a direction of dendritic lithium growth when the electron-insulating protective layer of the lithium electrode includes a polymer porous layer according to the present disclosure.
Figure 8:
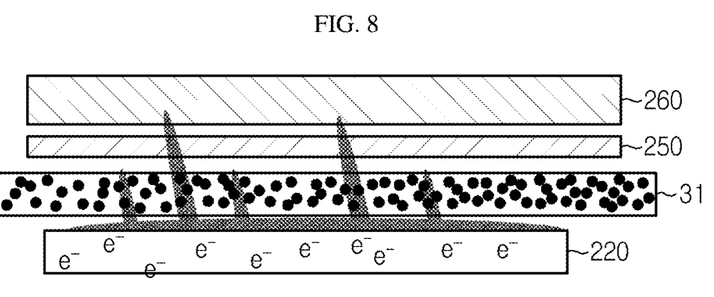
FIG. 8 illustrates a direction of dendritic lithium growth when no polymer porous layer is present in the electron-insulating protective layer.

For example, referring to FIG. 7 and FIG. 8, when the electron insulating protective layer 230 formed on the lithium metal layer 220 includes both the non-porous layer 31 and the polymer porous layer 32 (FIG. 7), it is possible to prevent dendritic lithium grown from the lithium metal layer 220 through the non-porous layer 31 from being in contact with the counter electrode 260 through the separator 250 by inducing the growth of dendritic lithium toward the inner part of the polymer porous layer 32 along the surface thereof. Particularly, since the polymer porous layer 32 has an asymmetric structure in which it has a relatively large pore size at the interface with the non-porous layer 31 and the pore size is decreased toward the upper part or vice versa, it is possible to induce the growth of dendritic lithium toward the inner part of the polymer porous layer 32. Thus, it is possible to delay a short-circuit in the battery and to detect a change in the battery before a short-circuit is generated as a result of rapid degradation of the battery performance. Such a change in the battery may be monitored with ease through the internal resistance of the battery. Therefore, it is possible to improve the safety against explosion during the use of the battery.

On the contrary, when the polymer porous layer is not present in the electron insulating protective layer (FIG. 8), dendritic lithium rapidly passes through the non-porous layer 31 from the lithium metal layer 220 and rapidly grows in a 'free-standing' form. Then, the dendritic lithium passes through the separator 250 and is in contact with the counter electrode 260 to cause an electrical short-circuit. In addition, growth of dead lithium is increased at the interface between the lithium metal layer and the non-porous layer 31, resulting in rapid degradation of the battery.

Preferably, the electron insulating protective layer may have a total thickness of 1-1,000 μm.

According to the present disclosure, the lithium ion-isolating layer 140, 240, 340, 440, 550 may be disposed on the top surface of the surface irregularity structure of the current collector, in the upper side of the lithium metal layer and in the upper side of the electron-insulating protective layer, or merely on the top surface of the surface irregularity structure of the current collector.

The lithium ion-isolating layer may include a polymer which has electron insulating property and cannot transport lithium ions. For example, the lithium ion-isolating polymer may include a polyolefin-based, polyester-based, polyamide-based or a polyurethane-based polymer, or a combination of two or more thereof. The lithium ion-insulating polymer may be formed by using such polymers in a film-like shape through coating, vapor deposition, or the like.

Since the lithium ion-isolating layer has electron insulating property so that electrons cannot arrive at the lithium ion-isolating layer, it is possible to inhibit reactions of lithium ions and to prevent dendritic lithium from growing upwardly.

In other words, the lithium ion-isolating layer according to the present disclosure serves to prevent not only transport of electrons but also transport of lithium ions.

The lithium ion-isolating layer may be disposed on the top surface of the surface irregularity structure of the current collector, in the upper side of the lithium metal layer and in the upper side of the electron-insulating protective layer, or merely on the top surface of the surface irregularity structure of the current collector. Thus, it is possible to inhibit dendritic lithium from growing vertically from the section of the current collector effectively. In other words, according to an embodiment of the present disclosure, it is possible to inhibit vertical growth of dendritic lithium by virtue of the lithium ion-isolating layer. In addition, even when dendritic lithium is grown, it is possible to induce the growth of dendritic lithium toward a direction between the lithium metal layer and the non-porous layer, or toward a direction substantially in parallel with the polymer porous layer inside of the polymer porous layer, by virtue of the above-mentioned electron insulating protective layer. As a result, it is possible to delay a short-circuit in the battery and to improve life characteristics of the battery.

Particularly, the lithium ion-isolating layer may be disposed 1) on the top surface of the surface irregularity structure of the current collector which is not coated with any one of the lithium metal layer and the electron insulating layer but exposed to the outside, 2) on the upper side of the lithium metal layer not coated with the electron insulating layer and disposed in the same direction as the top surface of the surface irregularity structure of the current collector, and 3) on the upper side of the electron insulating protective layer disposed in the same direction as the top surface of the surface irregularity structure of the current collector.

In addition, the thickness of the lithium ion-isolating layer is not particularly limited, as long as it can control diffusion of lithium ions. For example, the lithium ion-isolating layer may have a larger thickness as compared to the organic/inorganic composite non-porous layer.

The lithium metal electrode according to the present disclosure may be obtained by the following method, but is not limited thereto.

First, a current collector having a surface irregularity structure provided with a top surface is prepared. The surface irregularity structure may be formed by using a conventional patterning process.

Next, a lithium metal layer is formed on the external surface of the current collector except the top surface of the surface irregularity structure of the current collector. The lithium metal layer may be formed through vapor deposition, plating or lamination of a lithium active material.

Then, slurry for forming a non-porous layer is coated and dried on the outside of the lithium metal layer to form a precursor of non-porous layer. The slurry for forming a non-porous layer is prepared by introducing the above-described inorganic solid electrolyte and electrolyte-swelling polymer, followed by agitation, and is coated and dried according to a conventional method.

After that, slurry for forming a polymer porous layer is coated and dried on the outside of the precursor of non-porous layer. The slurry for forming a polymer porous layer is prepared by introducing the above-mentioned polymer into a solvent. The polymer can be swelled with an electrolyte and has a porous structure.

Then, slurry for forming a lithium ion-isolating layer is coated and dried on the top surface of the surface irregularity structure of the current collector, in the upper side of the lithium metal layer and in the upper side of the electron insulating protective layer, or on the top surface of the surface irregularity structure of the current collector. The coating and drying may be carried out by using the conventional processes. The slurry for forming a lithium ion-isolating layer may be prepared by using a polymer which has electron insulating property and is not capable of transporting lithium ions, and particular examples of the polymer include polyolefin-, polyester-, polyamide- and polyurethane-based polymers.

Finally, the precursor of lithium metal electrode to which the lithium ion-insulating layer is introduced is subjected to cold isostatic pressing (CIP) to form a non-porous layer.

As used herein, 'cold isostatic pressing' refers to a process of sealing the precursor of lithium metal electrode in a sealed rubber-made container and applying isostatic pressure to the container having the precursor of lithium metal electrode by using a vacuum pump capable of applying pressure uniformly.

The isostatic pressure may range from ambient pressure to 300 MPa.

In this manner, it is possible to form a non-porous layer having a true density of 1.8-2.1 $g/cm^3$.

The above-described lithium electrode according to the present disclosure includes a current collector patterned with a surface irregularity structure, a lithium metal layer, an electron insulating layer including a non-porous layer and a polymer porous layer, and a lithium ion-isolating layer. Thus, it is possible to inhibit growth of dendritic lithium. Even when dendritic lithium is grown, it is possible to control the direction of growth and to inhibit non-uniform growth, and thus to improve the safety and to provide improved life characteristics and rate characteristics. In addition, since the lithium electrode according to the present disclosure uses a patterned current collector, it has a three-dimensional structure and is provided with flexibility. In addition, in the lithium electrode, the gaps in the pattern show a cushioning effect during the volumetric swelling of the lithium electrode. Therefore, it is possible to prevent a collapse of the electrode structure. In another aspect, there is provided a lithium secondary battery including the above-described lithium electrode. Particularly, the lithium secondary battery may be obtained by injecting a lithium salt-containing electrolyte to an electrode assembly including a cathode, an anode and a separator interposed between the cathode and the anode, wherein the anode may be the lithium electrode according to the present disclosure.

Herein, the lithium secondary battery may have a cylindrical, prismatic, pouch, flexible or coin shape.

In addition, since the lithium electrode according to the present disclosure is provided with an electron insulating protective layer, the separator may be eliminated when forming the electrode assembly.

In still another aspect of the present disclosure, there is provided a flexible secondary battery including the lithium electrode. Particularly, the lithium electrode may be used as an internal electrode for a cable-type secondary battery. Reference can be made to following description of the flexible secondary battery for the constitutional elements other than the lithium electrode.

Any material used conventionally for a cathode for a lithium secondary battery may be used for the cathode. Particularly, examples of the cathode active material may include any type of active material particles selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \le x < 0.5$, $0 \le y < 0.5$, $0 \le z < 0.5$, $0 < x+y+z \le 1$), or a mixture of two or more of them. In addition, foil prepared by using aluminum, nickel or a combination thereof may be used as a cathode current collector. Further, the conductive material and binder described above with reference to the lithium electrode may be incorporated.

The cathode may be obtained by dispersing an active material, binder, conductive material, or the like, to a solvent, such as N-methyl pyrrolidone, acetone or water to form slurry, coating the slurry onto a current collector and removing the solvent through drying. Herein, any coating process used conventionally in the art, such as a slot die coating process, Mayer bar coating process, gravure coating process, dip coating process or a spray coating process, may be used.

The separator may be a porous polymer film used conventionally as a separator for a lithium secondary battery. For example, a porous polymer film obtained by using a polyolefin-based polymer such as ethylene homopolymer, propylene homopolymer, ethylene/butane copolymer, ethylene/hexane copolymer or ethylene/methacrylate copolymer may be used alone, or a stack of such polymers may be used. In addition, an insulating thin film having high ion permeability and mechanical strength may be used. The separator may include a safety reinforced separator (SRS) provided with an organic/inorganic porous coating layer including inorganic particles interconnected and fixed by means of a binder polymer and coated on the surface of a separator substrate, such as a porous polymer film to a small thickness.

In addition to the above examples, a conventional porous nonwoven web, such as a nonwoven web made of glass fibers having a high melting point or polyethylene terephthalate fibers may be used.

The electrolyte includes a lithium salt and an organic solvent for dissolving the lithium salt.

Any lithium salt used conventionally for an electrolyte for a secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent contained in the electrolyte may be a conventional solvent with no particular limitation. Typical examples of the organic solvent may be at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulforane, gamma-butyrolactone, propylene sulfite and tetrahydrofuran.

Particularly, among the carbonate-based organic solvents, ethylene carbonate and propylene carbonate which are cyclic carbonates are preferred, since they are high-viscosity organic solvents and have a high dielectric constant, and thus dissociate the lithium salt in the electrolyte well. When using such cyclic carbonates in combination with low-viscosity low-dielectric constant linear carbonates, such as dimethyl carbonate and diethyl carbonate, at an adequate ratio, it is possible to prepare an electrolyte having high electroconductivity more preferably.

Optionally, the electrolyte used according to the present disclosure may further include additives, such as an overcharge-preventing agent, contained in the conventional electrolytes.

The lithium secondary battery according to the present disclosure may be obtained by interposing a separator between a positive electrode and a negative electrode to form an electrode assembly, introducing the electrode assembly into a battery casing, such as a pouch-like, cylindrical or prismatic battery casing, and injecting an electrolyte thereto. In a variant, after stacking the electrode assemblies, the stacked electrode assemblies may be immersed in an electrolyte, and the resultant structure may be introduced to and sealed in a battery casing to finish a lithium secondary battery.

According to another embodiment of the present disclosure, the lithium secondary battery may be a stacked, wound, stacked and folded or cable-type lithium secondary battery.

The lithium secondary battery according to the present disclosure may be applied not only to a battery cell used as a power source for compact devices but also to a medium- to large-size battery module including a plurality of battery cells as a unit cell. Preferred examples of such medium- to large-size devices include electric vehicles, hybrid electric vehicles, plug-in hybrid electric vehicles, power storage systems, or the like. Particularly, the lithium secondary battery according to the present disclosure may be useful for hybrid electric vehicles, new and renewable energy storage batteries, or the like, requiring high output.

In yet another aspect of the present disclosure, there is provided a flexible secondary battery.

Figure 9:
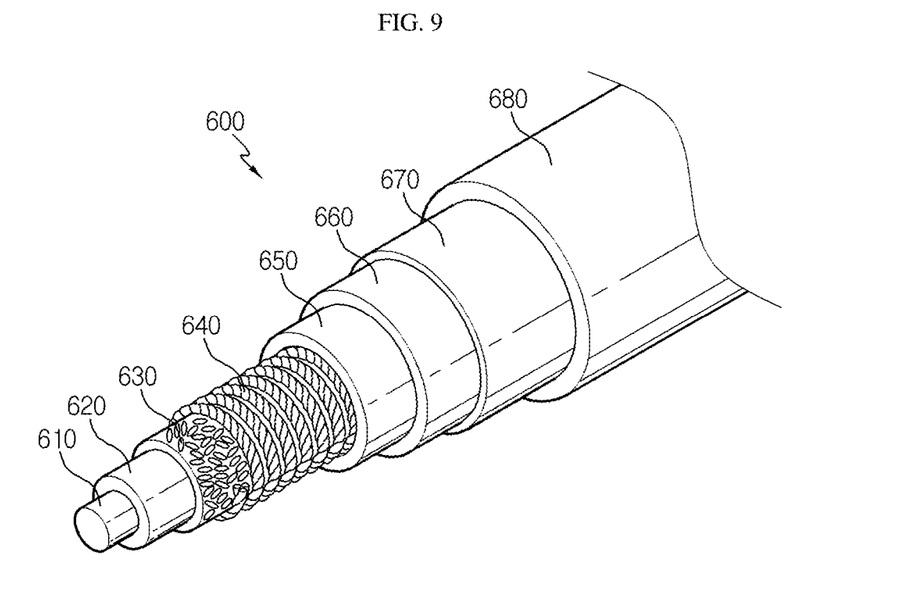
FIG. 9 is a schematic view illustrating the structure of the flexible secondary battery according to an embodiment of the present disclosure.
Figure 10:
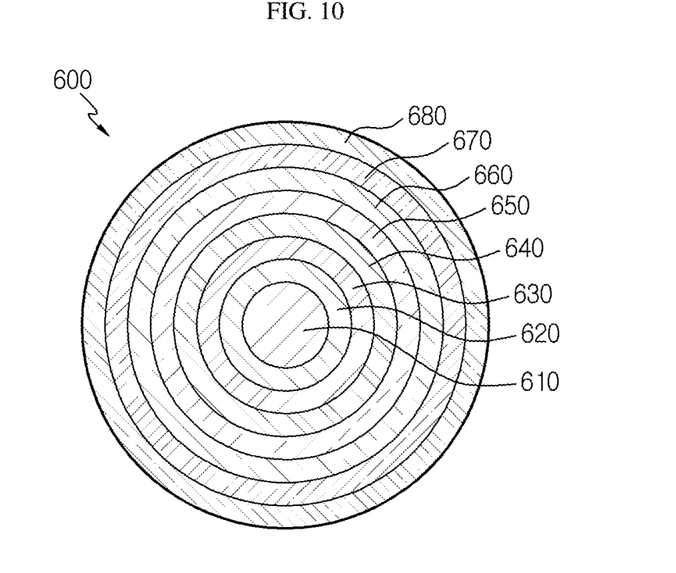
FIG. 10 is a sectional view illustrating the flexible secondary battery according to an embodiment of the present disclosure.

FIG. 9 is a schematic view illustrating the flexible secondary battery according to an embodiment of the present disclosure, and FIG. 10 is a sectional view of FIG. 9.

Referring to FIG. 9 and FIG. 10, the flexible secondary battery 600 according to an embodiment of the present disclosure includes: an internal electrode provided with an internal current collector 610 and a lithium-containing internal electrode layer 620 surrounding an outside of the internal current collector 610; an electron-insulating protective layer 630 surrounding an outside of the internal electrode; an electron-insulating support 640 surrounding an outside of the electron-insulating protective layer; a separator layer 650 surrounding an outside of the electron-insulating support; and an external electrode provided with an external electrode layer 660 surrounding an outside of the separator layer and an external current collector 670 surrounding an outside of the external electrode layer. The flexible secondary battery 600 according to an embodiment of the present disclosure may further include a protective coating 680 outside of the external current collector 670.

The flexible secondary battery according to an embodiment of the present disclosure has a predetermined shape of horizontal section and may have a linear structure elongated in the longitudinal direction to the horizontal direction. In addition, the flexible secondary battery may have flexibility and can be deformed freely.

As used herein, the term 'predetermined shape' refers to a shape not limited to a particular shape. Any shape may be used as long as it does not adversely affect the present disclosure.

As used herein, the term 'spiral' or 'helical' refers to a shape twisted and wound in a predetermined range and generally covers a shape similar to the shape of a general spring.

As used herein, the term 'outside' means the external region of the corresponding component and covers both the portion of an element that is in contact with the surface of the corresponding component and the portion of the element spaced apart from the corresponding component. In the latter case, another layer may be interposed between the portion of the element that is in contact with the surface and the portion of the element that is spaced apart therefrom.

According to the present disclosure, the internal electrode may be an anode which includes an internal current collector 610 and a lithium-containing internal electrode layer 620 surrounding the outside thereof.

The internal current collector may be a linear wire-type current collector or an open structured current collector having an inner space.

The term 'open structure' refers to a structure which has the open structure as a boundary surface and allows free mass transfer from the inside to the outside through the boundary surface. As a result, injection of an electrolyte may be facilitated through the internal current collector.

The open structured current collector may be a spirally wound wire-type current collector, spirally wound sheet-type current collector, or two or more wire type current collectors wound spirally so that they may cross each other.

The open structured internal current collector may be made of stainless steel, aluminum, nickel, titanium, baked carbon, copper; stainless steel surface-treated with carbon, nickel, titanium or silver; aluminum-cadmium alloy; a non-conductive polymer surface-treated with a conductive material; or a conductive polymer, copper being preferred.

The current collector functions to collect the electrons generated by the electrochemical reaction of an electrode active material or to supply the electrons required for electrochemical reaction. In general, such a current collector uses a metal, such as copper or aluminum. Particularly, when using a polymer conductor including a non-conductive polymer surface-treated with a conductive material or a conductive polymer, it is possible to provide relatively higher flexibility as compared to the current collector using a metal, such as copper or aluminum. In addition, a polymer current collector may be used instead of a metal current collector to accomplish weight lightening of a battery.

The conductive material may be any one selected from the group consisting of polyacetylene, polyaniline, polypyrrole, polythiophene, polysulfur nitride, indium tin oxide (ITO), silver, palladium and nickel, and the conductive polymer may include polyacetylene, polyaniline, polypyrrole, polythiophene, polysulfur nitride, or the like. However, there is no particular limitation in the type of non-conductive polymer used for the current collector.

In the space formed inside of the open structured current collector, an internal electrode current collector core portion may be provided.

The internal electrode current collector core portion may be made of carbon nanotubes, stainless steel, aluminum, nickel, titanium, baked carbon, copper; stainless steel surface-treated with carbon, nickel, titanium or silver; aluminum-cadmium alloy; a non-conductive polymer surface-treated with a conductive material; or a conductive polymer.

In addition, in the space formed inside of the open structured current collector, a lithium ion-supplying core portion containing an electrolyte may be provided.

Since the internal current collector according to the present disclosure has an open structure, the electrolyte of the lithium ion-supplying core portion may pass through the internal current collector and arrive at the internal electrode active material layer and the external electrode active material layer. Therefore, there is no need for increasing the thickness of an electrolyte layer excessively. Rather, the electrolyte layer is not an essential constitutional element, and thus only a separator may be used selectively. In other words, the flexible secondary battery according to an embodiment of the present disclosure may be provided with a lithium ion-supplying core portion containing an electrolyte, and thus facilitates infiltration of the electrolyte into the electrode active material. Thus, it is possible to facilitate supply and exchange of lithium ions in an electrode, and thus to provide a battery with excellent capacity characteristics and cycle characteristics.

The lithium ion-supplying core portion includes an electrolyte. Although there is no particular limitation in the electrolyte, it is preferred to use a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butryolactone (γ-BL), sulfolane, methyl acetate (MA) or methyl propionate (MP); a gel polymer electrolyte using PEO, PVdF, PVdF-HFP, PMMA, PAN or PVAC; a solid electrolyte using PEO, polypropylene oxide (PPO), polyethylene imine (PEI), polyethylene sulfide (PES) or polyvinyl acetate (PVAC); or the like. In addition, the electrolyte may further include a lithium salt, such as LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lithium lower aliphatic carboxylate or lithium tetraphenylborate. In addition, the lithium ion-supplying core portion may include an electrolyte alone. In the case of a liquid electrolyte, a porous carrier may be used.

Further, in the space formed inside of the open structured current collector, a filler core portion may be formed.

The filler core portion may include materials for improving various properties of the flexible secondary battery, other than the above-described materials forming the internal electrode current collector core portion and lithium ion-supplying core portion. Particularly, the filler core portion may include polymer resins, rubber, inorganic materials, or the like, in various shapes, such as wire, fiber, powder, mesh, foam, or the like.

According to the present disclosure, the lithium-containing internal electrode layer 620 surrounds the outside of the internal current collector and may be formed by coating a lithium-based active material to realize high capacity. Any conventional coating processes may be used and particular examples thereof include electroplating or lamination processes.

The lithium-containing internal electrode layer may have a thickness of 1-500 μm.

Particular examples of the lithium-based active material may include lithium, lithium oxides, lithium alloys and lithium alloy oxides, particularly lithium.

According to the present disclosure, the electron insulating protective layer 630 may be formed to surround the outside of the lithium-containing internal electrode layer 620. Referring to FIG. 6, the electron insulating protective layer 630 has a dual layer structure including a non-porous layer 31 and a polymer porous layer 32, as described hereinabove with reference to the lithium metal electrode.

According to the present disclosure, the electron insulating support 640 may be provided in a wire-like, i.e. spring-like shape wound spirally on the outside of the electron insulating protective layer 630, as shown in FIG. 9. The electron insulating support functions as a flexible framework of a battery provided between the internal electrode and the external electrode.

In addition, the electron insulating support 640 may be provided in a mesh-like shape of hollow shape.

The electron insulating support 640 may be made of a polymer or polymer-coated metal.

The polymer may be a polyolefin-, polyester-, polyacryl-, polyamide- or a polyurethane-based polymer, and the metal may be a metal forming the internal current collector or external current collector, wherein the metal surface is coated with a non-conductive polymer.

Particularly, when the electron insulating support 640 is a wire-type support, the pitch P (i.e. winding interval) may be constant or may be decreased or increased gradually.

Figure 11:
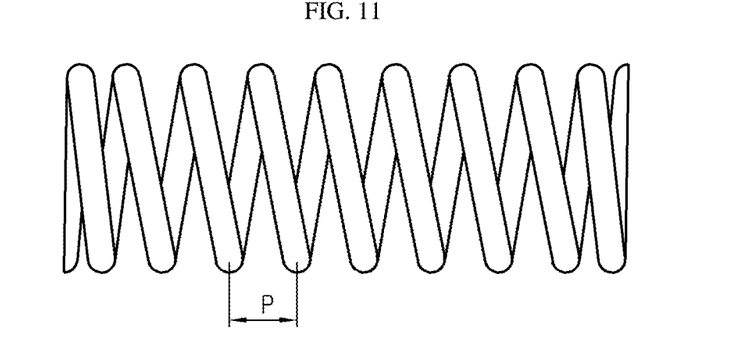
FIG. 11 illustrates the definition of the term 'pitch' used in the present disclosure.

As shown in FIG. 11, the term 'pitch' means the interval between one coil and another coil in a general coil spring shape, and refers to the winding interval in a wound wire-type support.

Figure 12:
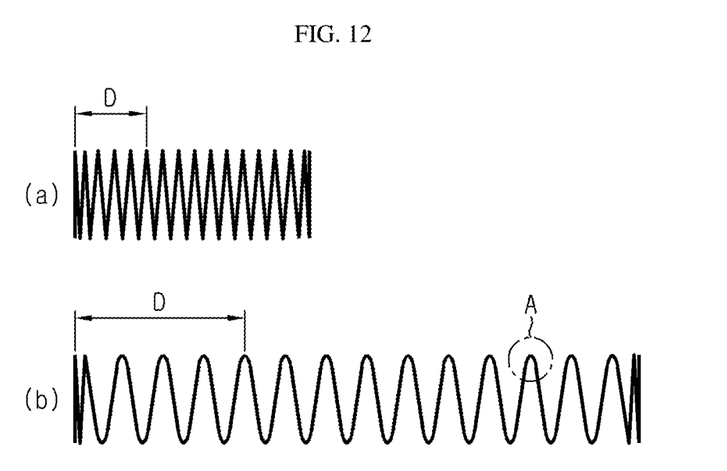
FIG. 12 illustrates a controllable pitch in the wire-type electron-insulating support provided in the flexible secondary battery according to an embodiment of the present disclosure.

As shown in FIG. 12, it is possible to ensure a channel through which the electrolyte moves smoothly by controlling the pitch interval D within a range of 1 μm-1 cm in the wire-type electron insulating support 640. It is also possible to alleviate the volumetric swelling of the lithium-containing internal electrode layer through the space between the pitches, even when dendritic lithium is grown in the lithium-containing internal electrode layer. By virtue of the electron insulating property, it is possible to minimize deposition of lithium on the surface of the support and thus to inhibit generation of a short-circuit caused by dendritic lithium.

Figure 13:
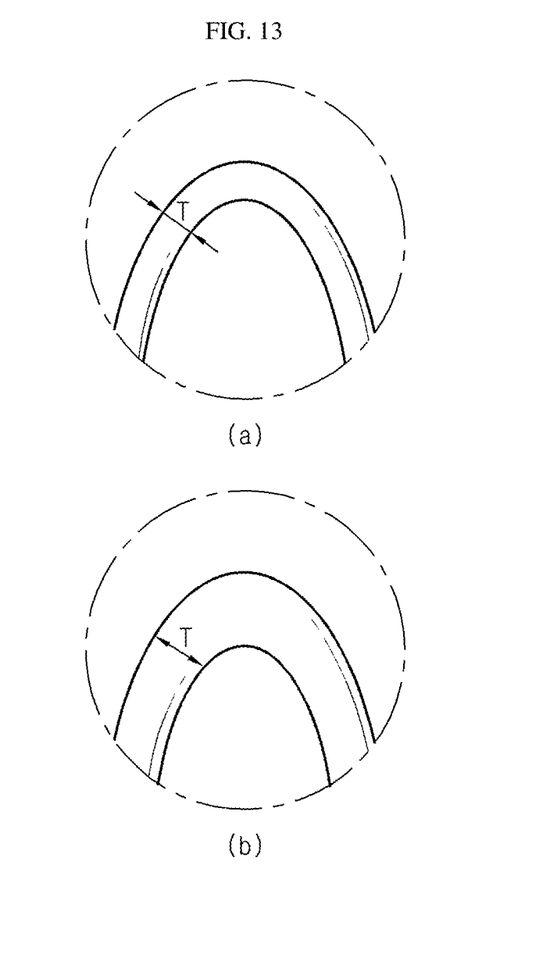
FIG. 13 illustrates a controllable thickness of the wire-type electron-insulating support as shown in FIG. 12.

FIG. 13 illustrates that the thickness T of the wire-type electron insulating support as shown in FIG. 12 can be controlled. The thickness of the wire-type support may be controlled within a range of 100 μm-3 mm. Therefore, it is possible to control the size of the space between the pitches, and thus to delay degradation of the life of a battery caused by growth of dendritic lithium.

According to an embodiment of the present disclosure, the separator layer 650 may be an electrolyte layer or a separator. The separator layer may be formed by extrusion coating in terms of the characteristics of a linear flexible secondary battery. When a separator is used as a separator layer, the separator layer may be formed by winding the separator around the electron insulating support.

The electrolyte layer functions as an ion channel, and may be made of a gel polymer electrolyte using PEO, PVdF, PVdF-HFP, PMMA, PAN or PVAC; or a solid electrolyte using PEO, polypropylene oxide (PPO), polyethylene imine (PEI), polyethylene sulfide (PES) or polyvinyl acetate (PVAC).

The electrolyte layer may further include a lithium salt in order to improve ion conductivity and reaction rate. The lithium salt may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lithium lower aliphatic carboxylate, lithium tetraphenylborate and a combination thereof.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

According to an embodiment of the present disclosure, the external electrode may be a cathode which includes an external electrode layer 660 and an external current collector 670 surrounding the outside thereof.

The external electrode layer 660 may be formed by coating and drying slurry containing an active material, a conductive material and a binder. The coating may be carried out by dip coating, or by using a comma coater or slot die coater.

The active material may be any one selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and 0≤x<0.5, 0≤y<0.5, 0≤z<0.5, 0<x+y+z≤1).

The conductive material that may be used herein includes carbon black, acetylene black, ketjen black, carbon fibers, or the like.

The binder that may be used herein includes polyvinylidene fluoride-co-hexafluoropropylene, polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrroldone, tetrafluoroethylene, polyethylene, polypropylene, polyacrylate, styrene-butyrene rubber (SBR), or the like.

The external current collector 670 may be a pipe-type, wound wire-type, wound sheet-type or mesh-type current collector, and may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

In addition, at least one additional separator layer and internal electrode may be incorporated successively between the separator layer and the external electrode.

The flexible secondary battery according to the present disclosure may be further provided with a protective coating 680. The protective coating is an insulating body and is formed on the outer surface of the external electrode in order to protect the electrode from the moisture in the air and external impacts. The protective coating may include a conventional polymer resin including a waterproof layer. For example, the polymer resin may include PET, PVC, HDPE or epoxy resin, and the waterproof layer may include aluminum or a liquid crystal polymer having excellent waterproof property.

Figure 14:
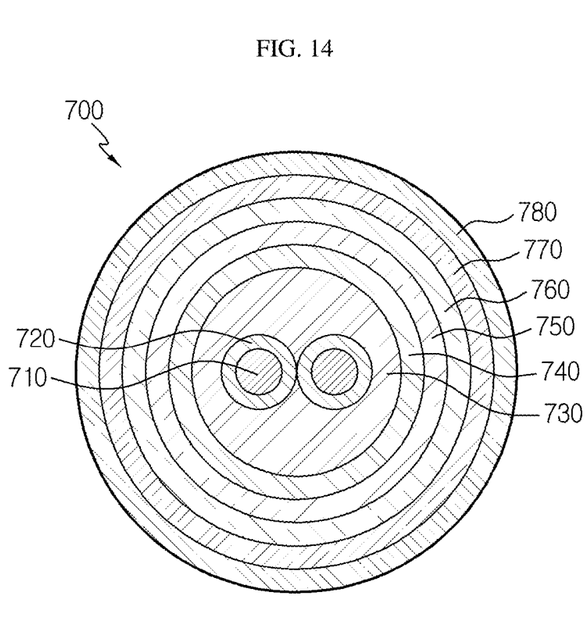
FIGS. 14-16 are sectional views illustrating the flexible secondary battery including two or more internal electrodes according to another embodiment of the present disclosure.
Figure 15:
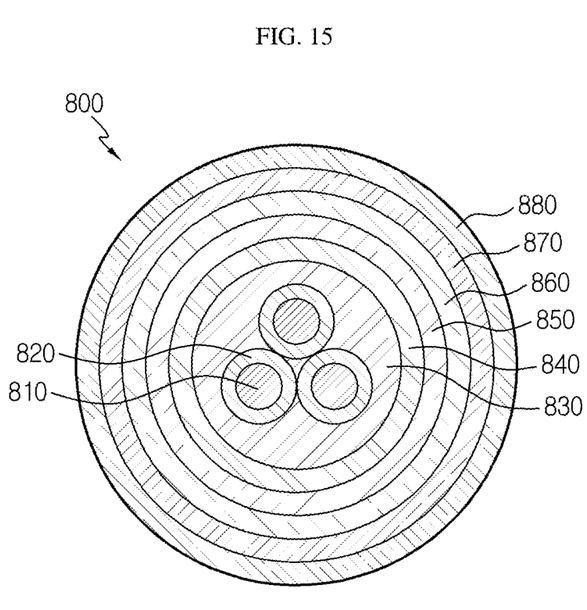
Figure 16:
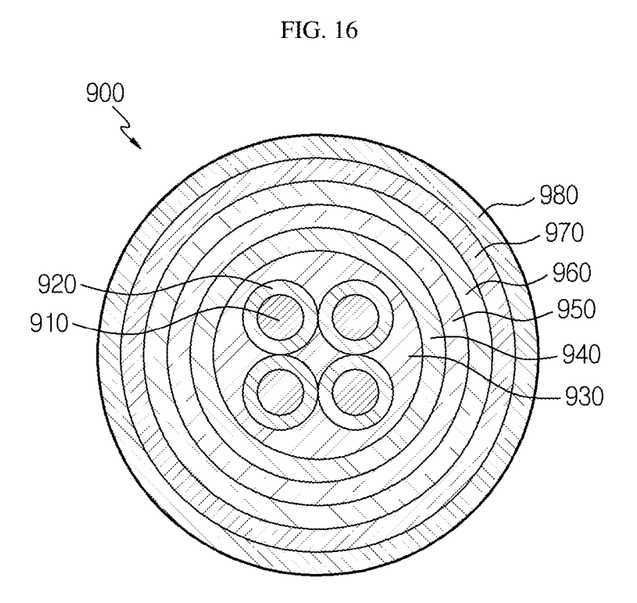

Further, the flexible secondary battery according to the present disclosure may include two or more internal electrodes. Therefore, as shown in FIGS. 14-16, the flexible secondary battery 700, 800, 900 according to another embodiment of the present disclosure includes: two or more internal electrodes each provided with an internal current collector 710, 810, 910 and a lithium-containing internal electrode layer 720, 820, 920 surrounding the outside of the internal current collector; an electron-insulating protective layer 730, 830, 930 surrounding the outside of the two or more internal electrodes; an electron-insulating support 740, 840, 940 surrounding the outside of the electron-insulating protective layer; a separator layer 750, 850, 950 surrounding the outside of the electron-insulating support; and an external electrode provided with an external electrode layer 760, 860, 960 surrounding the outside of the separator layer and an external current collector 770, 870, 970 surrounding the outside of the external electrode layer. The flexible secondary battery 700, 800, 900 may further include a protective coating 780, 880, 980.

Each electron insulating protective layer 730, 830, 930 may include an organic/inorganic composite non-porous layer and a polymer porous layer surrounding the outer surface thereof. Particular description of the electron insulating protective layer is the same as described above.

Figure 17:
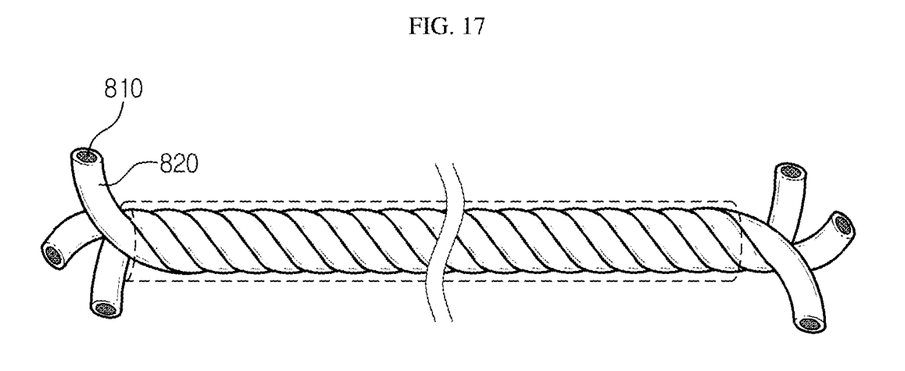
FIG. 17 is a schematic view illustrating three wire-type internal electrodes twisted spirally while crossing each other in the flexible secondary battery according to still another embodiment of the present disclosure.

The two or more internal electrodes may be disposed in parallel with each other (FIGS. 14-16), or may be disposed in a spirally twisted form while crossing each other (FIG. 17).

Since the flexible secondary battery 700, 800, 900 is provided with an internal electrode having a plurality of electrodes, it is possible to control the loading amount of an electrode layer and battery capacity by adjusting the number of internal electrodes. In addition, sine the flexible secondary battery is provided with a plurality of electrodes, it is possible to prevent disconnection.

The flexible secondary battery as described above uses a lithium-containing electrode layer as an internal electrode to realize high capacity, and is provided with an electron insulating protective layer and electron insulating support outside of the lithium-containing electrode layer to inhibit non-uniform growth of dendritic lithium and to ensure a channel through which an electrolyte moves smoothly. Thus, the flexible secondary battery has improved safety and excellent life characteristics.

The flexible battery according to the present disclosure may be used not only for a battery cell used as a power source for a compact device but also as a unit cell of a medium- to large-size battery module including a plurality of battery cells. Particularly, the flexible lithium secondary battery according to the present disclosure may be used advantageously as a power source in various wearable environments.

What is claimed is:

1. A lithium metal electrode comprising:
   a current collector having a surface irregularity structure;
   a lithium metal layer disposed outside of the surface irregularity structure except an uppermost surface of the surface irregularity structure in the current collector;
   an electron-insulating protective layer disposed outside of the lithium metal layer; and
   a lithium ion-isolating layer disposed (1) on the uppermost surface of the surface irregularity structure of the current collector, or (2) on the uppermost surface of the surface irregularity structure of the current collector, on an uppermost surface of the lithium metal layer, and on an uppermost surface of the electron-insulating protective layer,
   wherein the electron-insulating protective layer comprises a non-porous layer transporting lithium ions and having no pores, and a polymer porous layer disposed outside thereof.

2. The lithium metal electrode according to claim 1, wherein the electron-insulating protective layer has a thickness of 1-1,000 μm.

3. The lithium metal electrode according to claim 1, wherein the non-porous layer in the electron-insulating protective layer has a thickness of 1-500 nm.

4. The lithium metal electrode according to claim 1, wherein the lithium ion-isolating layer comprises a polyolefin-based, polyester-based, polyamide-based or a polyurethane-based polymer, or a combination of two or more thereof.

5. The lithium metal electrode according to claim 1, wherein the surface irregularity structure is provided with protrusions formed upwardly, and grooves formed between adjacent ones of the protrusions.

6. The lithium metal electrode according to claim 5, wherein vertical sections of the protrusions have at least one shape selected from tetragonal, trapezoidal and cross shapes, and vertical shapes of the grooves have at least one shape selected from semi-circular, sector, triangular, tetragonal and dumbbell shapes.

7. The lithium metal electrode according to claim 1, wherein the polymer porous layer comprises a polymer film having a porous structure capable of being swelled with an electrolyte.

8. The lithium metal electrode according to claim 7, wherein the polymer film having a porous structure capable of being swelled with an electrolyte comprises sponge polyurethane.

9. The lithium metal electrode according to claim 1, wherein the non-porous layer comprises an inorganic solid electrolyte and an electrolyte-swelling polymer.

10. The lithium metal electrode according to claim 9, wherein the inorganic solid electrolyte and the electrolyte-swelling polymer are used at a weight ratio of 70:30 to 98:2.

11. The lithium metal electrode according to claim 9, wherein the inorganic solid electrolyte comprises an oxide-based, phosphate-based, nitride-based or a sulfide-based electrolyte, or a combination of two or more thereof.

12. The lithium metal electrode according to claim 9, wherein the electrolyte-swelling polymer comprises a polyolefin-based, polyester-based, polyacryl-based, polyamide-based, polyurethane-based, cellulose-based, hydrocarbon-based or a polyol-based polymer, or a combination of two or more thereof.

13. The lithium metal electrode according to claim 9, wherein the non-porous layer further comprises a non-dielectric inorganic material comprising $Al_2O_3$, $SnO_2$, $Cu_3N_2$, $CeO_2$, MgO, NiO, CaO, ZnO, $ZrO_2$, $Y_2O_3$, $TiO_2$, SiC or $Li_3N$, or a combination of two or more thereof.

14. A lithium secondary battery comprising a cathode, an anode, a separator interposed between the cathode and the anode, and an electrolyte, wherein the anode is the lithium metal electrode as defined in claim 1.

15. The lithium secondary battery according to claim 14, which is a cylindrical, prismatic, pouch, flexible or a coin lithium secondary battery.

* * * * *